United States Patent

[11] 3,579,826

| [72] | Inventor | Eldon W. Morain<br>Tulsa, Okla. |
|---|---|---|
| [21] | Appl. No. | 840,201 |
| [22] | Filed | July 9, 1969 |
| [45] | Patented | May 25, 1971 |
| [73] | Assignee | Continental Industries, Inc.<br>Tulsa, Okla. |

[54] TOOL FOR SIMULTANEOUSLY BEVELING MATING PIPES
1 Claim, 15 Drawing Figs.

[52] U.S. Cl. .................................................... 30/93,
30/99, 82/4.3
[51] Int. Cl. ....................................................... B23d 21/06

[50] Field of Search............................................ 30/93, 94,
95, 99, 103; 82/1, 4.3; 83/3; 219/119; 314/23

[56] References Cited
FOREIGN PATENTS
524,348   1940   Great Britain................   219/119

*Primary Examiner*—Othell M. Simpson
*Assistant Examiner*—M. Koczo
*Attorney*—Head & Johnson

ABSTRACT: This invention relates to a method for permanently joining the ends of two lengths of plastic pipe and includes a beveling tool and heating tool for use in preparing the pipes for the joining.

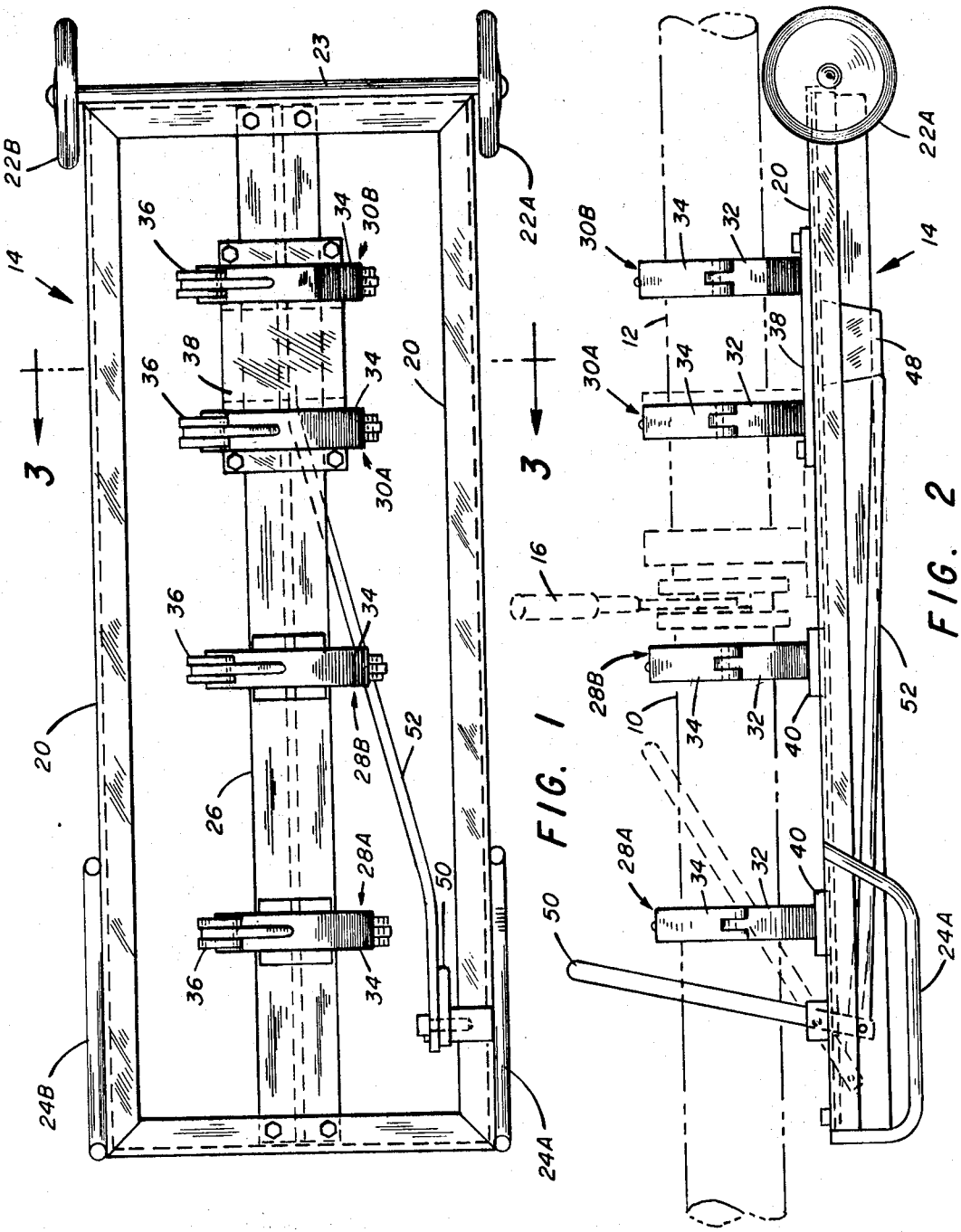

INVENTOR.
ELDON W. MORAIN
BY
Head & Johnson
ATTORNEYS

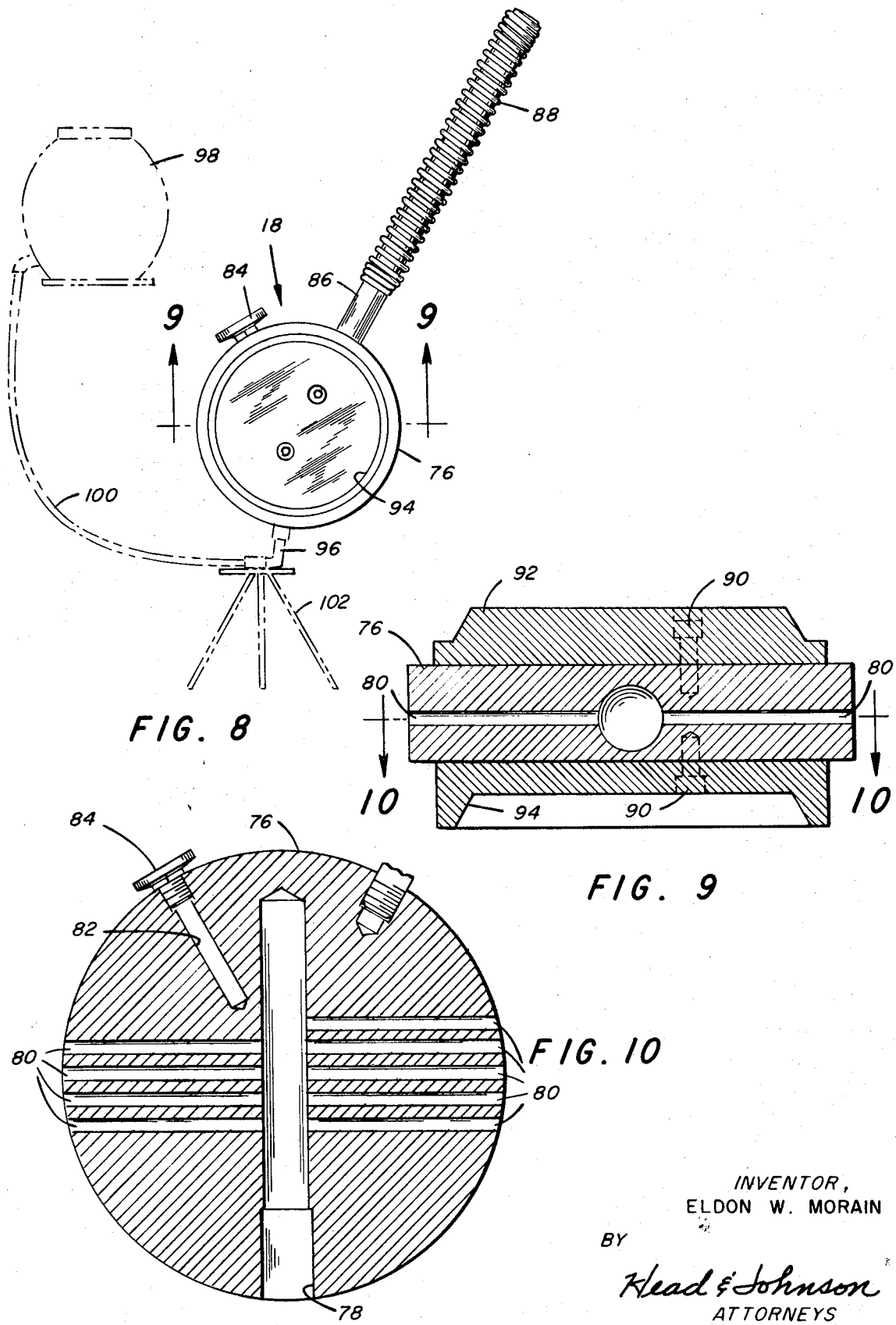

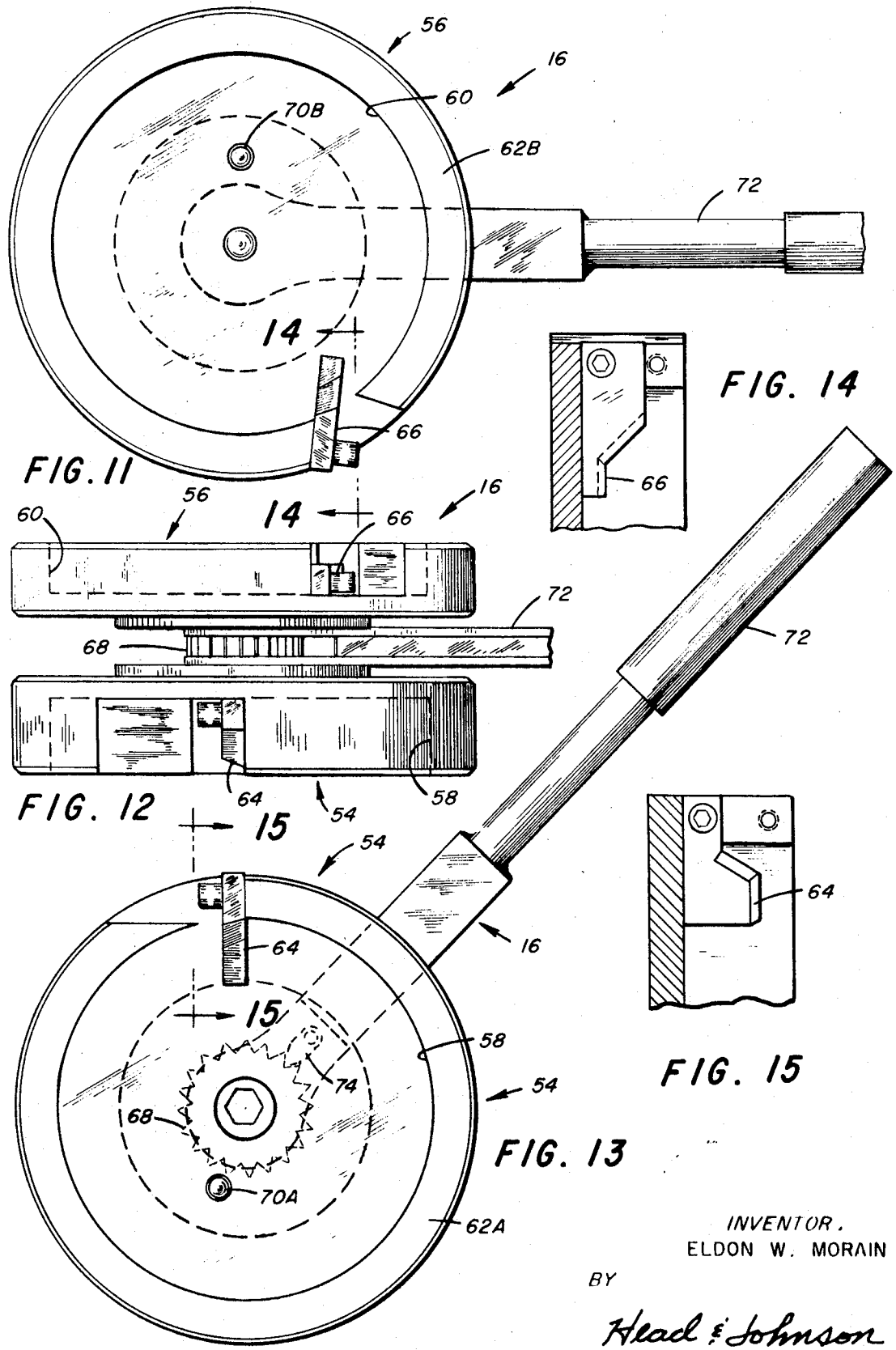

TOOL FOR SIMULTANEOUSLY BEVELING MATING PIPES

BACKGROUND OF THE INVENTION

This invention relates to a method and apparatus used therein for joining plastic pipe and more particularly to a method and apparatus for fusing two lengths of plastic pipe end to end.

Plastic pipe is well known and has received wide acceptance in commercial and residential applications due to its noncorrosive and long-life characteristics. However, heretofore, during installation of the pipe, difficulties have been encountered in joining two lengths of plastic pipe end to end in such a manner that the pipes will be permanently joined and will not become separated after a short period of time. Assurance of the permanency of the joint is of crucial importance in installations where the run of pipe is buried in the earth or encased in concrete thereby rendering access to the pipes for reparation of the joint laborious and expensive. In order to eliminate any possibility of pipe disjunction, one practice is to obtain the pipe wound on a spool and of sufficient length to lay one continuous run between the terminal points where a pipe is needed; however, even though this practice obviously circumvents any pipe disjunction, problems inherent therein include bulky handling increasing installation costs. Careless performance of the prescribed steps produces a latently defective joining of the pipes which may result in an eventual separation thereof. Epoxy glue and the like have been used to join the lengths of pipe; however, this method requires the installer to meticulously follow prescribed steps such as cleaning the ends of the pipe before application of the glue and applying the glue evenly along the entire periphery of the ends to be joined.

It is an object of this invention to present a method whereby two lengths of plastic pipe are permanently joined end to end by fusion.

It is another object of this invention to present a method wherein two lengths of plastic pipe may be joined which can be easily performed in the field or at other installation locations.

It is a further object of this invention to provide tools for implementing the aforesaid method of joining two lengths of plastic pipe.

SUMMARY OF THE METHOD

Generally, the method for joining the pipes comprises the steps of: axially aligning the two pieces of pipe end to end; forming a bevel on the ends of the pipe, one end having a female bevel and the other a male bevel; heating the ends of the two pieces of pipe to a fusion point, and mating the beveled ends of the pipe whereby upon cooling the two lengths of pipe are permanently joined.

BRIEF DESCRIPTION OF THE DRAWINGS

FIG. 1 is a plan view of a holding cart which is an element of this invention.

FIG. 2 is a side view of the holding cart.

FIG. 8 is a side view of a heating tool which is an element of this invention.

FIG. 9 is a cross-sectional view of the heating tool taken along the line 9—9 of FIG. 8.

FIG. 10 is an additional cross-sectional view of the heating tool taken along the line 10—10 of FIG. 9.

FIG. 11 is a side view of the beveling tool which is an element of this invention.

FIG. 12 is a top view of the beveling tool which is an element of this invention.

FIG. 13 is a side view of the beveling tool opposite the one taken in FIG. 11.

FIG. 14 is a view of a cutting element of the beveling tool as taken along the line 14—14 of FIG. 11.

FIG. 15 is a view of the cutting element of the beveling tool as taken along the line 15—15 of FIG. 13.

DESCRIPTION OF THE PREFERRED EMBODIMENT

Figure 3:
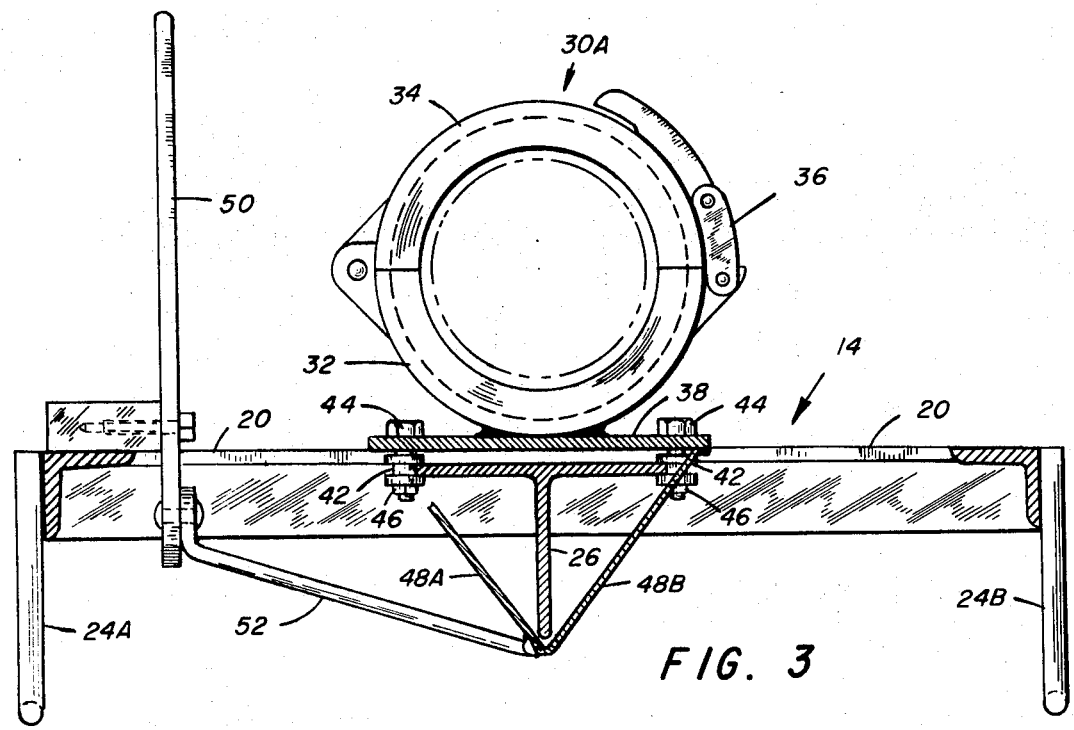
FIG. 3 is an end view of the holding cart taken along line 3—3 of FIG. 1.

In describing the preferred embodiment of this invention, specific terminology will be used for the sake of clarity. However, it is to be understood that the words so chosen are not to be taken as words of limitation and that all words used include all technical equivalents which operate in a similar manner to accomplish a similar result.

The apparatus used to join juxtaposed ends of two lengths of pipe 10 and 12 includes a holding cart 14 shown in FIGS. 1 and 2, a beveling tool 16 shown in FIGS. 11 through 15, and a heating tool 18 shown in FIGS. 8 through 10.

Referring now to FIGS. 1 and 2, the holding cart 14 has a rectangular frame 20 made from materials such as angle iron. Rotatably received on frame 20 at one end thereof are two dolly wheels 22A and 22B coupled by and connected to the respective end of an axial shaft 23 transversing the end of frame 20. At the end of the frame 20 opposite the dolly wheels and attached to each of the longitudinal sides thereof are U-shaped legs 24A and 24B extending vertically downwardly from the frame a sufficient distance so that the frame 20 lies in a horizontal plane when the cart is in use.

Passing longitudinally through the middle of frame 20 and rigidly affixed thereto at both ends to the end members by suitable means is a support plate 26.

Projecting upwardly in tandem-spaced relationship from the support plate 26 are stationary circular clamps 28A and 28B and sliding clamp members 30A and 30B. All of the clamp members have a lower portion 32 and an upper portion 34 pivotally attached together at one point and having diametrically opposite the pivotal point suitable latching means 36. The inner diameter of the clamp member is substantially equal to the outer diameter of the pipes. The slidable clamps 34A and 34B are rigidly attached to a carriage 38 and project vertically upward therefrom in tandem-spaced relationship and are concentrically and axially aligned with the stationary clamp members 28A and 28B which are attached directly to the support plate 26 by means of spacers 40 which are of a thickness equal to that of carriage 38.

As can best be seen in FIG. 3, on the underside of carriage 38 at each of the corners thereof a spool 42 is rotatably journaled on a threaded bolt 44 which passes downwardly vertically through the carriage 38 and held thereon by means of a nut 46 which threadably engages the lower end of the bolt 44. Engagement of the longitudinal edges of the support plate 26 intermediate the upper and lower flanges of the spools 42 slidably receives carriage 38 thereon. Extending obliquely downwardly and inwardly from and along the length of the outer longitudinal edges of the carriage 38 are two carriage support members 48A and 48B which abut together along the lower ends thereof.

As shown in FIG. 2, extending upwardly from the holding cart in the area of leg 24A is a lever 50 pivotally attached to the frame by suitable means. The lower end of the lever 50 communicates with the carriage 38 by means of connecting rod 52 which is rigidly attached to the abutted lower ends of the carriage supports 48A and 48B and which is pivotally attached to the lower end of the lever 50 whereby pivotal movement of the lever about the attachment point to the frame imparts longitudinal movement of the carriage 38 with respect to the support plate 26.

Looking now at FIGS. 11 through 15, and especially at FIG. 12, the beveling tool 16 incorporates in concentric alignment a female beveling portion 54 and a male beveling portion 56. Both beveling portions 54 and 56 contain an integral circular receptacle 58 and 60 for the axial receiving of ends of the lengths of plastic pipe 10 and 12.

Each receptacle 58 and 60 is bounded by a raised lip surface 62A and 62B substantially around the outer periphery thereof. Perpendicularly attached by suitable means to each raised lip surface and extending transversely inwardly therefrom is a cutting edge 64 and 66; the cutting edge 60 is so shaped as to cut a female bevel in the end of a pipe placed in the recessed receptacle 58; in like manner, the cutting edge 62 is so shaped as to cut a male bevel in the end of a pipe within the receptacle 60.

Intermediate the concentrically aligned beveling portions 54 and 56 is a ratchet wheel 68 rigidly attached to both beveling portions by studs 70A and 70B. Rotatably journaled around the ratchet wheel 68 is a handle 72 which projects outwardly and perpendicularly from the axis of the ratch wheel and beyond the periphery of the beveling portions 54 and 56. The handle 72 has thereon a ratchet pawl 74 which engages the teeth of the ratchet wheel 68 whereby a clockwise rotation of handle 72 imparts rotative movement to the beveling portions 54 and 56.

Looking now at FIGS. 8 through 10, the heating tool 18 includes a cylindrical disc 76 having diametrically passing substantially therethrough from the periphery thereof a borehole heat receptacle 78. A plurality of heat-dissipating boreholes 80 project perpendicularly from the heat receptacle 78 in two directions transversely through the disc 76 to the periphery thereof. Extending inwardly from the periphery of the disc 76 substantially to the midpoint of the heat receptacle 78 is a borehole 82 for receiving a temperature indicator 84 such as a thermometer. Extending outwardly from the periphery of the disc 76 is an elongated handle 86 having received thereon along substantially the length thereof a heat insulator 88. Looking particularly now at FIG. 9, concentrically attached by countersunk studs 90 to one side of the cylindrical disc 76 is a circular male beveled platen 92 and on the opposite side a circular female beveled platen 94; the beveled platens are insertable into the beveled ends of the pipes 10 and 12. Both beveled platens 92 and 94 have thereon a coating of Teflon.

OPERATION

In operation, heat is introduced in the heating tool 18 by any suitable means such as directing into the heat receptacle 78 a flame fed by a butane heater 96 which communicates with a butane supply tank 98 through conduit 100. A heater holder stand 102 may be used to facilitate the heating operation.

Figures 4, 5:
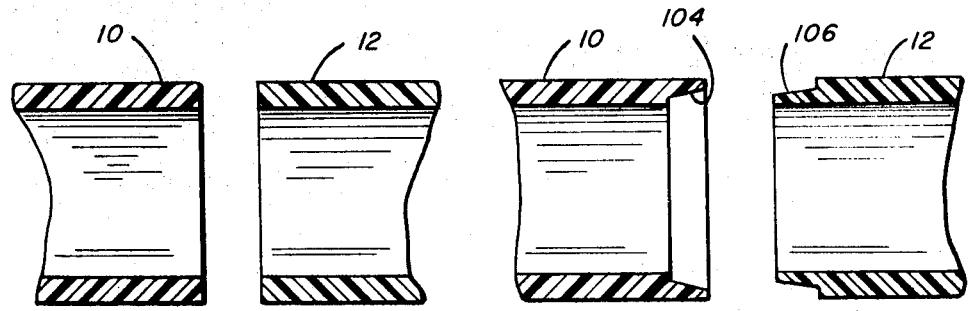
FIG. 4 is a cross-sectional view of the ends of the two lengths of pipe in juxtaposed position.
FIG. 5 is a cross-sectional view of the ends of the two lengths of plastic pipe having bevels cut therein.

While the heating tool 18 is being heated, the first plastic pipe 10 is placed in the clamps 28A and 28B with the end to be joined protruding forwardly of clamp 28B and held tightly therein by latching means 36. In like manner the second pipe 12 is inserted and locked in clamps 34A and 34B thereby placing the pipes in longitudinal axial relationship with the ends to be joined in juxtaposed relationship as shown in FIG. 4. Counterclockwise pivotal movement of the lever 50 imparts forward longitudinal movement to carriage 38 thereby sufficiently widening the gap between the ends of the pipes 10 and 12 to allow positioning of beveling tool 16 therebetween and in concentric axial alignment therewith, whereupon the lever 50 is given pivotal clockwise rotation thereby sliding pipe 12 rearwardly with the resulting effect that the end of pipe 10 is received in receptacle 58 of the beveling tool 16 and pipe 12 is received in the receptacle 60 of the beveling tool 16. By downward pivotal movement of the handle 72 the cutting edges 64 and 66 cut simultaneously a female bevel 104 in the end of pipe 10 and a male bevel 106 in the end of pipe 12 as shown in FIG. 5. During this beveling operation, clamps 28A and 28B and 30A and 30B restrain the pipes from rotating with the beveling member 16.

Figures 6, 7:
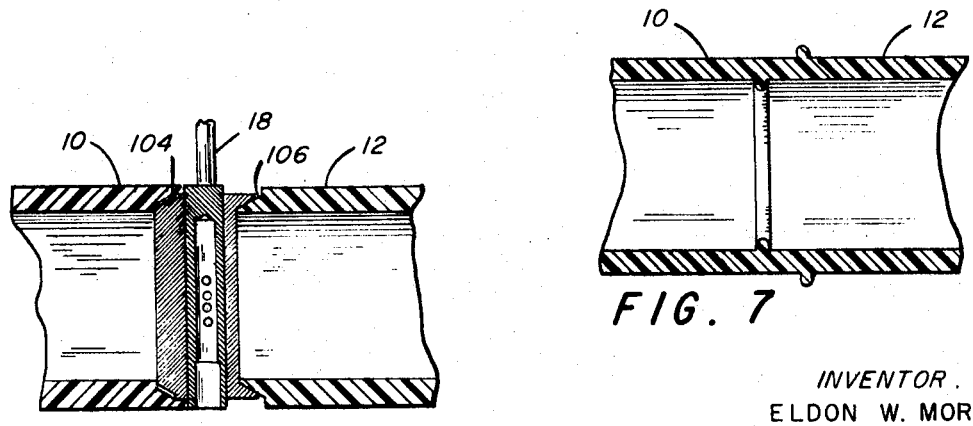
FIG. 6 is a cross-sectional view of the ends of two lengths of plastic pipe having intermediate thereof a heating tool which is an element of this invention.
FIG. 7 is a cross-sectional view of two lengths of plastic pipe permanently joined.

After the beveling member has been rotated 360° around the periphery of the ends of the pipes, the lever 50 is given counterclockwise pivotal movement, thereby moving the pipe 12 forwardly and enabling the beveling member 16 to be removed from its position intermediate the ends of the pipes. At this point the heating tool 18 is removed from the heat source and inserted concentrically and axially intermediate the ends of pipe and the lever 50 is employed to place the ends of the pipe contiguous with the male and female bevel platens of the heating tool 18 as shown in FIG. 6. Heat conducted through the disc 76 and the beveled platens 92 and 94 simultaneously bring the ends of the pipes 10 and 12 to the fusion point whereupon the heating tool 18 is removed from intermediate the ends of the pipes and the male beveled end 106 of pipe 12 is abutted to the female beveled end 104 of pipe 10. Upon cooling, the pipes are fused together in permanent join as shown in FIG. 7.

The invention has been described as it particularly relates to joining lengths of pipe. It can be seen that fittings, such as tees, elbows, etc., can be joined in the same way and, therefore, the word "pipe" as used herein includes any plastic item having a tubular end to be joined.

While the invention has been described with a great deal of particularity, and with reference to specific illustrated embodiments, as means of exemplifying the invention, it is manifest that many changes may be made in the details of the invention, the apparatus used for practicing the invention, and the steps of carrying out the invention, without departing from the spirit and scope of the invention.

I claim:
1. A beveling tool for use in preparing an end of a first piece of plastic pipe and an end of a second piece of plastic pipe for joining together comprising:

a male beveling portion having an integral receptacle for axially receiving said end of one of said pipes and having near the outer boundary of said receptacle a cutting edge facing said end when said end is received in said receptacle, said cutting edge being shaped so as upon rotation thereof to form in said end a male bevel;

a female beveling portion concentric with said male beveling portion and having an integral receptacle for receiving the end of said other piece of said pipes and having at the outer boundary of said receptacle a cutting edge facing said end when said end is received in said receptacle, said cutting edge being shaped so as upon rotation thereof to form in said end a female bevel, said respective receptacles of said beveling portions facing opposite directions;

a ratchet wheel intermediate said male and female beveling portions, concentric and parallel therewith, and, rigidly attached thereto, a handle pivotally received about said ratchet wheel and extending outwardly perpendicularly therefrom beyond said beveling portion, said handle having thereon a ratchet pawl engageable in the teeth of said ratchet wheel whereby when said ends are received in said receptacles pivotal movement of said handle in one direction imparts rotary movement to said beveling portions thereby simultaneously cutting a male bevel in the end of one of said pipes and a mating female bevel in the end of the other of said pipes.